United States Patent [19]
Wallace et al.

[11] Patent Number: 6,061,432
[45] Date of Patent: May 9, 2000

[54] VOICE MAIL SYSTEM FOR OBTAINING ROUTING INFORMATION FROM SIGNALING NODES

[75] Inventors: Harrison K. Wallace, Herndon; Robert D. Farris, Sterling, both of Va.; Michael J. Strauss, Potomac, Md.

[73] Assignee: Bell Atlantic Network Services, Inc., Arlington, Va.

[21] Appl. No.: 08/997,538

[22] Filed: Dec. 23, 1997

[51] Int. Cl.[7] .............................. H04M 1/64; H04M 7/00
[52] U.S. Cl. ..................... 379/88.18; 379/219; 379/230
[58] Field of Search .................................. 379/201, 207, 379/210, 211, 212, 219, 230, 88.18, 88.25, 67.1

[56] References Cited

U.S. PATENT DOCUMENTS

| | | | |
|---|---|---|---|
| 5,586,177 | 12/1996 | Farris et al. .............................. | 379/207 |
| 5,661,782 | 8/1997 | Bartholomew et al. ................. | 379/230 |
| 5,664,010 | 9/1997 | Walker et al. ........................... | 379/207 |
| 5,675,631 | 10/1997 | Kaminsky et al. ..................... | 379/67.1 |
| 5,708,697 | 1/1998 | Fischer et al. .......................... | 379/230 |

*Primary Examiner*—Paul Loomis
*Attorney, Agent, or Firm*—McDermott, Will & Emery

[57] ABSTRACT

A voice mail system includes SS7 signaling capabilities to communicate on a telephone signaling network. The voice mail system uses those capabilities to obtain routing information, for sending a recorded message to a destination mail system, by sending a query message to either a destination central office storing called party profile information or an intelligent signaling transfer point (ISTP) storing the called party profile information. The voice mail system records a voice mail message from a subscriber, and collects a destination telephone number indicating the intended recipient of the recorded message. The voice mail system generates a query message, and receives a response message via the signaling network from a non-AIN database, such as the destination central office or the ISTP. The voice mail system then initiates a line-sided connection with the destination voice mail system, and either sends SS7 signaling messages to identify the called party if the destination voice mail system has SS7 capabilities, or generates DTMF tones representing the called number when prompted.

27 Claims, 8 Drawing Sheets

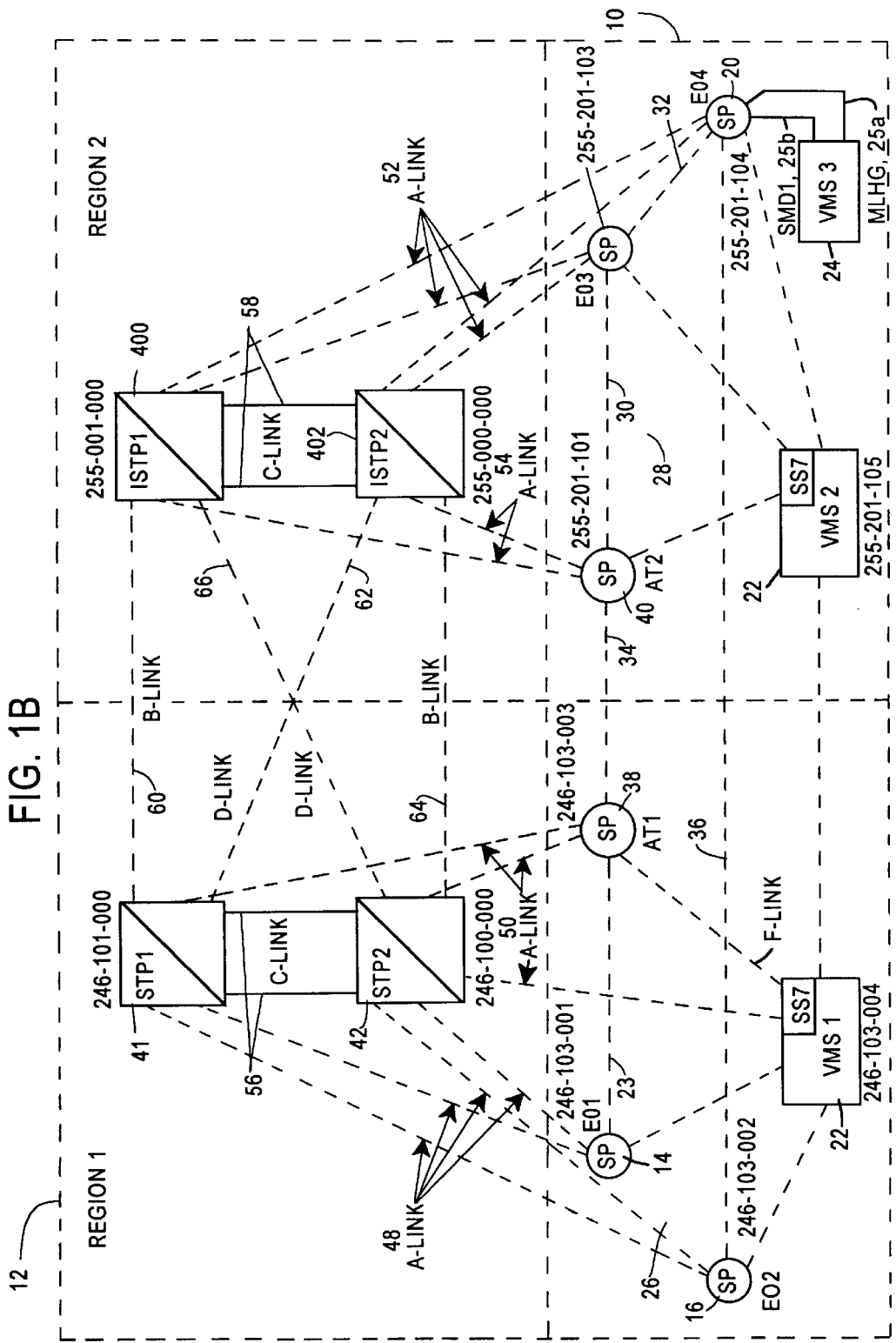

VOICE MAIL SYSTEM FOR OBTAINING ROUTING INFORMATION FROM SIGNALING NODES

BACKGROUND OF THE INVENTION

1. Technical Field

The present invention relates to switched communications networks providing voice mail services, more particularly to a system and method for providing communication between voice mailboxes in multiple mailbox systems using Common Channel Signaling (CCS) while obviating or blocking ringing signals.

2. Background Art

Voice mail has become commonplace not only in business usage but also on an individual telephone service subscriber basis through service from a central office. A voice mail system is a specialized computer that stores messages in digital form on a disk. The voice is generally digitized, usually at a much slower rate than the 64 Kb/s signal the central office uses in its switching network. The digitized voice is compressed and stored on a hard disk that maintains the voice mail operating system, system prompts, and greetings, and the messages themselves. A processor controls the compressing, storing, retrieving, forwarding and purging of files. A comprehensive review of exemplary voice mail systems and voice messaging systems is disclosed in U.S. Pat. No. 5,631,948 to Bartholomew et al., the disclosure of which is incorporated in its entirety herein by reference.

The above-incorporated Bartholomew et al. patent discloses a system and method of effecting transfer of a message such as a voice message from one centralized messaging system to another centralized messaging system in a switched communications network having a plurality of central offices connected to subscriber terminals and connected together by trunks. Specifically, the transfer of the message by one centralized messaging system is effected through a common channel signaling network using the existing advanced intelligent network (AIN) implementation of public switched telecommunications networks in the United States.

AIN conventionally provides services based on feature logic and data located at a centralized node in the network, such as a Service Control Point (SCP). Appropriately equipped switches in the network, known as Service Switching Points (SSP's), communicate with the SCP and together they provide various AIN services. The SSP knows which calls require AIN service based on characteristics of the call, such as the line it originated from or the digits that were dialed. The process of identifying calls that require AIN processing is known as "triggering", since a particular characteristic of the call "triggers" to switch into providing AIN treatment. Once a trigger occurs, a query message is sent to the SCP asking for instructions. Based on information contained in the query message, the SCP determines which service is being requested and provides appropriate information such as routing and billing instructions that the SSP then executes to complete the call. Only the SCP "knows" which service is being performed on a particular call. The SSP simply knows how to identify calls that require AIN processing and how to execute instructions provided by the SCP. For this reason, two services that are very different from the viewpoint of the subscriber and the SCP may appear identical to the SSP since it performs the same basic functions for both.

The above-incorporated Bartholomew et al. patent discloses a voice messaging system providing caller to remote mailbox and/or mailbox to remote mailbox communication using TCAP and SS7 messaging in the AIN while blocking or obviating trunking of voice messages. The disclosed system uses existing voice mail equipment interfaced to the telephone network and that is fully responsive to TCAP and SS7 protocols. According to Bartholomew et al., a caller desiring to leave a voice message in the mailbox of a remote person may use a telephone to access his own voice mail system and mailbox and to record the message. The voice processing unit of the mailbox may operate its voice menu to direct the caller to depress a specified key when satisfied with the message. The voice processing unit may then query the caller as to whether he desires to send the message and, if so, to depress another specified key. The voice unit may instruct the caller as to the procedure for keying in the identity of the destination and to depress a further specified key to send the message. The message is digitized in conventional fashion and stored in the mailbox of the sender. The caller may go on hook after depressing the designated send key. The depression of the send key causes the generation of a tone or other signal which is recognized by the acting SSP as a trigger. This local connection ends usage of the voice network.

The trigger causes the SSP to frame a TCAP inquiry message which is directed to the SCP for instructions. The TCAP message includes information identifying the calling station and mailbox and the called station and the fact that the caller is requesting mailbox to mailbox message transfer. The SCP consults its database to establish whether the caller is authorized to communicate mailbox-to-mailbox and as to the existence and identity of a mailbox for the called number. The SCP then originates a response to the SSP to dispatch one or more SS7 packets to the called directory number and mailbox along with an appropriate routing label and handling instructions and carrying as the included information in the SS7 packet the digitized voice retrieved from the mailbox of the sender. The information may be in T1 protocol which is conventionally the output digital signal of mailbox equipment regardless of manufacture.

Known voice mail systems such as disclosed in Bartholomew et al. are well adapted to efforts to network the voice mail systems. In particular, an organization known as The Message Alliance (TMA) has attempted to establish an open standard for voice mail systems. Work is underway to develop a set of standards known as Audio Message Interchange Service (AMIS) in the hope that when AMIS standards are approved, they will form a common language that network voice mail systems can support to enable communication between voice mail systems of different manufacturers.

In particular, TMA has proposed a voice mail messaging system where a subscriber having voice mail service dials into his or her voice mail system (the originating voice mail system), records a message, and inputs the telephone number of the called party. The originating voice mail system forwards the message and the input telephone number to a protocol translator. The protocol translator is a node connected to the public switched telephone network and that has a first connection for communication with the originating voice mail system and a second connection dedicated to communication with a centralized database. The protocol translator, implemented for example using an IBM RS 6000 system, converts the message and the corresponding telephone number from the protocol used by the originating voice mail system to a protocol compatible with the centralized database (e.g., AMIS). The protocol translator sends the converted message and telephone number to the centralized database via the second dedicated connection using, for example, an Asynchronous Transport Multiplex (ATM) transport layer.

The proposed TMA database stores telephone numbers for all voice mail boxes for all voice mail systems in the TMA network. Hence, all service providers having voice mail subscribers will have the respective voice mail box information stored in the TMA database. Upon receiving a message from the protocol translator, the TMA database will retrieve necessary information for accessing the voice mail box for the called party based on the supplied telephone number, and supply routing information back to the protocol translator. The protocol translator, using the routing information, then initiates a line-sided connection with the public switched telephone network to establish a connection with a destination node serving the voice mail system for the called party.

The disclosed Bartholomew et al. and TMA voice mail systems, however, suffer from the disadvantage that use of an AIN system to perform various call processing transactions results in relatively expensive implementation costs. Specifically, use of AIN components such as the SCP or the ISCP requires purchase, configuration, and maintenance of the AIN components above and beyond the existing switching office network and common channel signaling network. Reliance on the AIN system to perform more functions requires setting more AIN triggers into the switches, resulting in additional delays due to a greater number of TCAP queries that must be processed by either the SCP or the ISCP. Hence, the costs of the AIN system increase substantially as processing capacity of the AIN system needs to be increased by installing a greater number of SCP or ISCP nodes, or by upgrading the processing capacity of existing SCP or ISCP nodes.

DISCLOSURE OF THE INVENTION

There is a need for an arrangement that enables an originating voice mail system, having a message for transmission to a destination station served by a destination voice mail system, to obtain routing information related to the destination voice mail system without the necessity of accessing an AIN database for the routing information.

There is also a need for an arrangement that improves the efficiency of forwarding recorded messages between a source voice mail system and a destination voice mail system by using existing subscriber profile information within a central office switch to identify the destination voice mail system serving a called party.

There is also a need for a voice mail system having SS7 capabilities to send and receive signaling messages in the form of TCAP protocol messages via the Common Channel Signaling (CCS) network. In particular, there is a need for a voice mail system having SS7 capabilities to send a TCAP query message via the CCS network in order to obtain voice mail capabilities information and routing information from a corresponding subscriber profile record for a called party, where the called party is the intended recipient of a recorded message to be sent by the voice mail system, and where the requested information can be accessed from existing subscriber profile records without the necessity of AIN call processing.

These and other needs are attained by the present invention, where a voice mail system is configured to include SS7 capabilities in order to send and receive signaling messages in TCAP protocol via the CCS network. The voice mail system is configured to record a voice mail message from a subscriber, and to collect a destination telephone number from the subscriber indicating the intended recipient (i.e., the called party) of the recorded message. The voice mail system (i.e., the originating voice mail system) uses the SS7 capabilities to generate and transmit a TCAP query message to an end office switching system serving the destination telephone number. Since the end office switching system stores subscriber profile information related to the intended recipient of the recorded message, the end office switching system is able to respond to the TCAP query message by returning capabilities information and routing information to the originating voice mail system, the capabilities information specifying whether or not the destination telephone number subscribes to a voice mail system (i.e., the destination voice mail system) and the signaling capabilities of the destination voice mail system, and the corresponding routing information. The information enables the originating voice mail system to send the message to the destination voice mail system.

The conventional CCIS type call processing method typically involves an originating SS7-capable end office switching system suspending a telephone call and sending a message through the CCIS network to the end office switching system serving the destination telephone number to determine the status of the line serving the destination telephone number. If a user at a destination telephone number subscribes to a voice mail system, the end office switching system will store in its internal subscriber profile tables information on forwarding the incoming call to the associated destination voice mail system. Hence, the end office switching system will store at least the telephone number of a multi-line hunt group (MLHG) of a voice mail system serving the destination telephone number.

The inventors have realized that integration of SS7 capabilities into a voice mail system enables the voice mail system to obtain the necessary call routing information from existing end office switching systems serving the destination telephone number. Hence, the SS7-capable voice mail system can send a TCAP query message to access the MLHG telephone number of the destination voice mail system serving the destination telephone number. This enables the originating voice mail system to initiate a telephone call to the destination voice mail system to forward the recorded message into the voice mail box of the intended recipient. Alternately, the originating voice mail system may determine the capabilities of the destination voice mail system, and selectively transmit the recorded message via the SS7 signaling network. Hence, the originating voice mail system may access both routing information and capabilities information specifying the capabilities of the destination voice mail system.

Another aspect of the present invention relates to an originating voice mail system having SS7 capabilities and accessing routing information for a destination voice mail system from an alternate non-AIN node within the interoffice SS7 signaling network, namely an Intelligent Signaling Transfer Point (ISTP). Specifically, U.S. Pat. No. 5,586,177 to Farris et al. discloses a Signaling Transfer Point (STP) having a database storing call processing control information. The disclosed STP is adapted to trigger access to records within that database in response to signaling messages when certain conditions are met. According to the this aspect of the present invention, the originating voice mail system sends a TCAP query message via the SS7 signaling network to the ISTP, where the ISTP responds to the TCAP query message by supplying the necessary routing information to the originating voice mail system based on the destination telephone number. Hence, the ISTP can be used as an alternate distributed data source, without the necessity of AIN elements.

Hence, the present invention enables a voice mail system to obtain routing information for a destination voice mail system without requiring conventional AIN processing techniques of accessing data from a centralized node such as a Service Control Point (SCP) or an Integrated Service Control Point (ISCP). Rather, the present invention uses the distributed capabilities of end office switching systems, or alternately of intelligent STP's, to obtain routing information, where each end office switching system serves a group of subscribers and stores respective records of subscriber profile information. Use of the common channel signaling network also provides the advantage of relatively fast call processing using an existing infrastructure, especially since the common channel signaling network is designed to work at the speed associated with a central office initiating a telephone call.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 1A and 1B are block diagrams illustrating signaling systems for a public switched telephone network having SS7-capable voice mail systems according to first and second embodiments of the present invention, respectively.

BEST MODE FOR CARRYING OUT THE INVENTION

The disclosed embodiments are directed to a voice mail system capable of sending a query message via a common channel interoffice signaling network to obtain routing information from a local database specifying a destination voice mail system for a called party. According to the disclosed embodiment, the voice mail system (VMS) is configured to include SS7 capabilities. The voice mail system acts as a network node that receives line-sided connections under the control of signaling messages via the SS7 signaling network. In particular, a voice mail system having a message to be sent to a called party determines a Destination Point Code for a network node storing subscriber profile information for a called party based on the corresponding destination telephone number. The network node storing the subscriber profile information may be either an end office switching system serving the called party, or alternately an STP (signaling transfer point) having a database, referred to as an intelligent signaling transfer point (ISTP), described in detail below. The voice mail system receives a response to the query that specifies whether the called party subscribes to a destination voice mail system. Assuming the called party has voice mail capabilities (i.e., subscribes to a destination voice mail system), the voice mail system receives the routing information for transmission of the recorded message to the destination voice mail system.

VMS Signaling Via SS7 Network

Figure 1A:
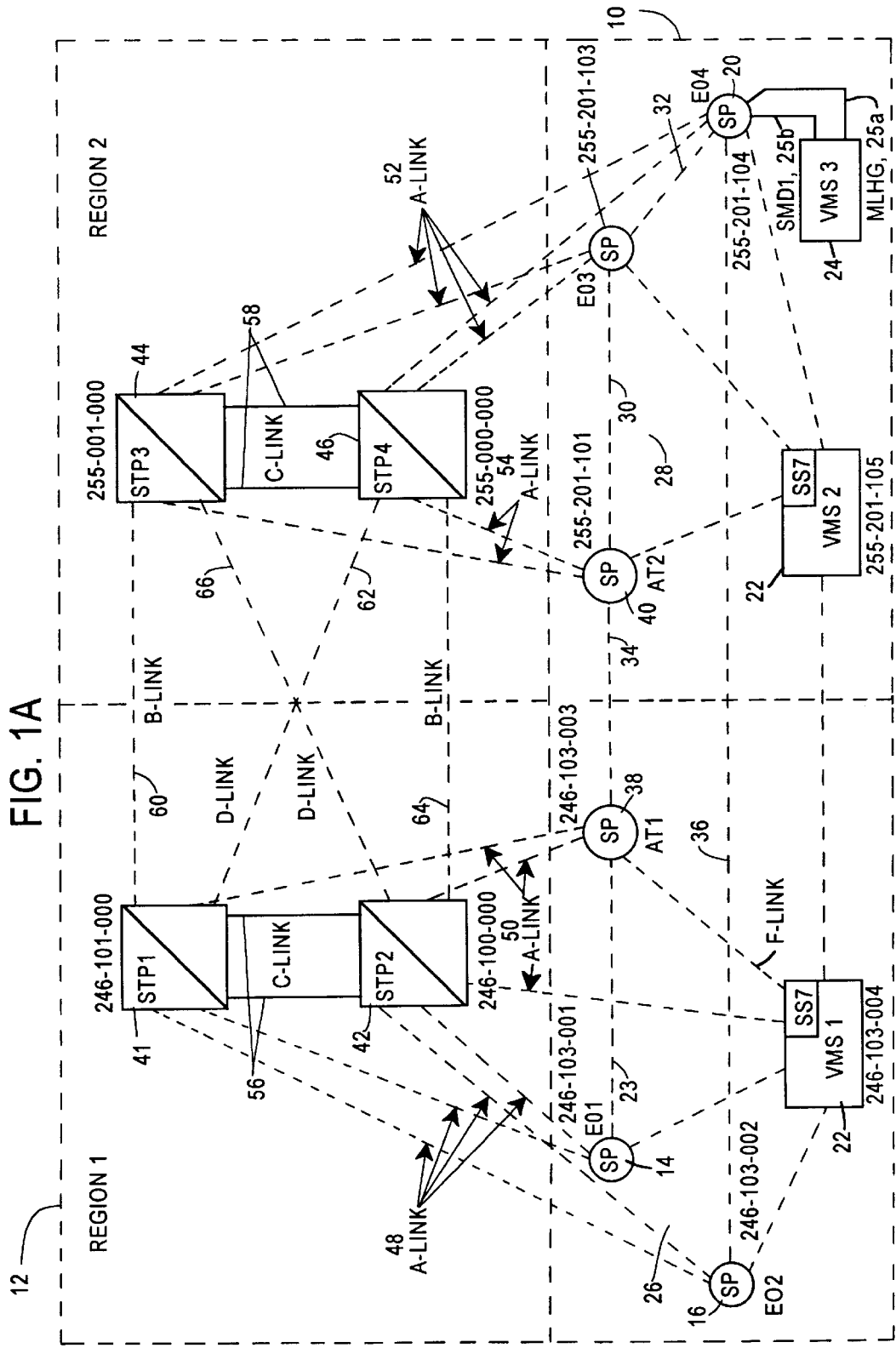

FIGS. 1A and 1B are block diagrams illustrating a public switched telephone network and the SS7 network that is used to control the signaling for the switched network. An analog switched telephone network is generally indicated at 10 having a common channel signaling network in the form of an SS7 network illustrated generally at 12. The switched telephone network includes a series of central offices which are conventionally referred to as signaling points (SPs) in reference to the SS7 network. The term "signaling points" refers to central offices that do not necessarily have the requisite capabilities for performing AIN queries; as such, SPs are distinguishable from SSPs (service switching points), which have AIN capabilities. Certain of these SPs comprise end offices (EOs) illustrated at 14, 16, 18 and 20 as EOs 1–4 in FIG. 1. The EO may be a local or "end office" type switch, such as a 1AESS or 5ESS switch sold by AT&T.

The disclosed embodiment also uses a second type of signaling point, namely a voice mail system VMS 22 with signaling capabilities, to send query messages and receive routing information related to recorded messages to be sent to a destination. The VMS 22 thus includes enhanced functionality over conventional voice mail systems, such as VMS 24 which receives voice calls over a Multi-Line Hunt Group (MLHG) 25a under the control of control signals communicated via the simplified message desk interface (SMDI) link 25b.

Each signaling point, including the SS7-capable VMSs 22, has a point code comprising a 9-digit code assigned to every node in the SS7 network. For example, EO1 has a point code of 246-103-001, EO2 has a point code of 246-103-002, EO3 has a point code of 255-201-103, and EO4 has a point code of 255-201-104.

The end offices EO1 and EO2 represent end offices in the region of one regional operating company, while end offices EO3 and EO4 represent end offices of the region of a different operating company. The point code specifies a network ID, a number specifying a cluster, and a number specifying a member of the cluster (e.g., an SP). Specifically, each operating company has its own network ID, shown in FIGS. 1A and 1B as 246 for Region 1 and 255 for Region 2. The number 103 in the designation 246-103-001, is the number of the cluster. A cluster can hold 32 SPs or members, the member being designated by the final 3 numbers. Thus 246 may represent C & P of Virginia Regional Operating Company, cluster 103, member EO2 for EO2 when viewed from an SS7 standpoint. The broken lines represent signaling links between the SPs and the SS7-capable VMSs. For example, signaling links 23, 26, 28, 30, 32, 34, and 36 are dedicated F-links (described below) extending directly between two signaling points for transporting signaling messages. Although not shown, the SPs are also connected by local trunks within a region and by inter-exchange carrier network trunks or ICN trunks across Access Tandems (ATs) 38 and 40 (AT1 and AT2). These SPs or ATs are shown as having point codes 246-103-003 and 255-201-101 respectively.

The SS7 network 12 comprises a series of Signal Transfer Points (STPs) shown in FIG. 1A at 41, 42, 44 and 46 designated STP1, STP2, STP3 and STP4. Each STP in a network is connected to the SPs and the SS7-capable VMSs in the network by A links indicated at 48, 50, 52 and 54. STP1 and STP2 constitute a mated pair of STPs connected by C links 56, while STP3 and STP4 constitute a mated pair connected by C links 58, each mated pair serving its respective transport area. It will be understood that there may be multiple mated pairs per region, one for each designated transport area. STP1 is connected to STP3 by B link 60 and to STP4 by D link 62. STP2 is connected to STP4 by B link 64 and to STP3 by D link 66.

FIG. 1B is a variation of the system of FIG. 1A, in that the STPs 44 and 54 of FIG. 1A are replaced with Intelligent Signaling Transfer Points (ISTPs) 400 and 402, described below, which have STP capabilities plus caller profile information.

As will be understood, the A, B, C and D links are physically identical with the designation relating to cost in terms of ease of access. The A links represent the lowest cost. B and D links have the same route cost with respect to SS7 so that the D designation is used only because it extends diagonally in the drawing. The C links are used to communicate between the two paired STPs for network management information and also constitute another route. The STPs in mated pairs have the same translations. Thus the translations in STP1 are the same as the translations in STP2, and the translations in STP3 are the same as the translations in STP4. The C links communicate between the paired STPs for network management information and SS7 message routing. The STP pair cannot function without the C links. Therefore, unnecessary utilization of the C links causes congestion and prevents the paired STPs from performing their intended function.

Another type of SS7 network link is an F link. An F link carries SS7 messages in the same form as other SS7 links, but the F link does not go to or come from an STP. Instead, the F link is a dedicated line extending directly between two signaling point (SP) nodes of the SS7 network. The VMSs use F links for sending and receiving signaling packets to another SP and/or to other nodes on the SS7 network, as discussed in more detail later.

The SS7 network constitutes a highly redundant data network, generally a 56K switched data circuit. By way of example, an SS7 message from EO2 to EO4 might travel any one of 8 possible routes. It could go from EO2 to STP1, from STP1 to STP3, STP3 to EO4. One variation on that route would be from STP1 down the D link 62 to STP4 to EO4, and so forth. In the event that a link between STP3 and EO4 was lost, an SS7 route could be established from EO2 to EO4 via STP1 to STP3 and then via C link 58 to STP4 to EO4. However, that would be an undesirable route in unnecessarily using the C link. A links provide direct connectivity while C links provide circuitous routes using extra switches, a situation to be avoided. An alternate route would be from STP1 via D link 62 to STP4 to EO4. Another reason for not using the C link is to avoid tying up the entire STP3-STP4 pair.

The SS7 network is typically used to transport signaling messages between end offices during call setup and tear down. A brief overview of call setup will be provided before describing the query messages sent by the SS7-capable VMS systems 22.

SS7 Signaling Protocol

The operation of placing a call from EO2 to EO4 may be described as follows: The user at EO2 picks up his phone and dials the number that resides in EO4. The SP generates an Initial Address Message (IAM). The IAM would have the destination point code of EO4, namely, point code 255-201-104. The IAM would also have an originating point code of EO2, namely, 246-103-002, in addition to miscellaneous other information needed for call set-up. That message would then be sent to either STP1 or STP2. Assuming that the message goes to STP1, STP1 would look at the message and determine that the message was not for it as an STP but rather is for EO4. STP1 would then investigate possible routings to get to the region having network ID "255" or EO4. The STP1 would choose one of the available B and D links to the STPs 3 or 4. Assuming that the STP1 chooses the B link to STP3, STP3 repeats the same procedure. Specifically, STP3 determines that the message is for 255 or EO4 and puts that message on the A link to EO4.

The SP EO4 gets the IAM which includes the called telephone number and determines whether or not the line serving the destination telephone number is busy. If the line is not busy, EO4 generates an Address Complete Message (ACM) to indicate that it received the request for a call and that the number is not busy. The ACM message includes a status indicator, typically indicating whether the line associated with the dialed number is available or busy. That message is sent back by simply reversing the point codes. Now the destination point code is EO2 and the originating point code is EO4. The message goes back to EO2 to indicate that the IAM was received and processed.

As soon as the phone is answered at EO4, EO4 sends an Answer Message (ANS) back to EO2 indicating that the phone at EO4 was picked up, and at that time the trunks are connected together. The SP EO2 then connects its user to the trunk circuit and EO4 connects its user to the trunk circuit so that communication is established. All of the SS7 messaging may occur in about 600 milliseconds, which would be average but not necessarily fast.

The foregoing constitutes the function of the STPs insofar as routing and call setup is concerned. The STPs look at a destination point code, and if it is not for them, they just pass the message on via a route determined from translations and routing tables. The C link is the last route permitted and is not utilized unless no other route is available. As described below, voice mail systems use the SS7 signaling network to send queries to the appropriate end office, as opposed to sending signaling messages for call setup.

A review of SS7 protocol will provide a better understanding of the use of the SS7 signaling network by a voice mail system to send and receive queries.

Figure 2:
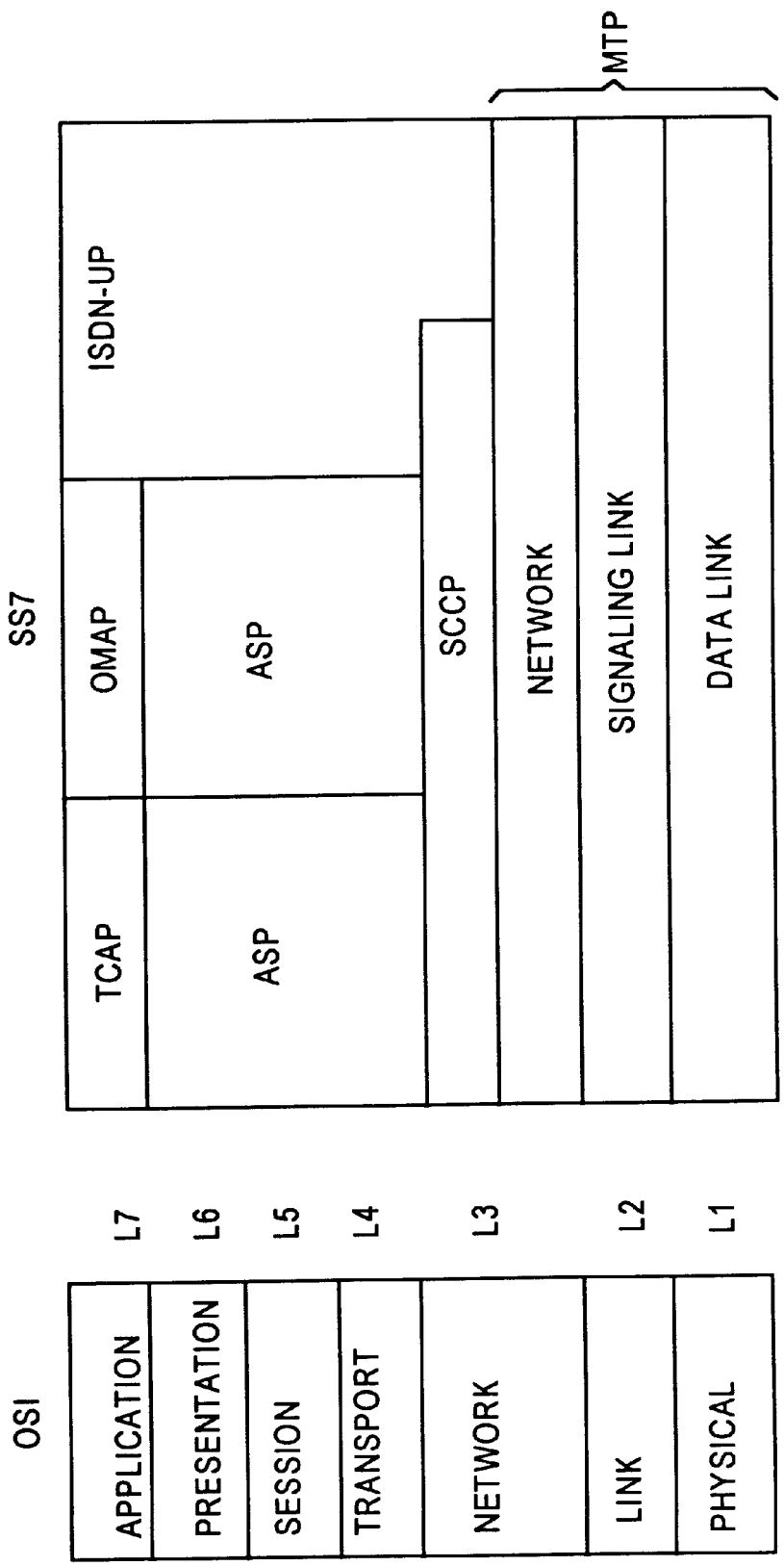
FIG. 2 is a diagram of the protocol stack for SS7 in comparison to the Open Systems Interconnect (OSI) model.

FIG. 2 is a diagram illustrating the SS7 protocol stack compared to the Open Systems Interconnection (OSI) reference model by the International Standards Organization (ISO). The OSI reference model specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level, in a "horizontal" direction.

The lowest layer defined by the OSI model is the physical layer (L1). This layer provides transmission of raw data bits over the physical communication channel through the particular network. The layer next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. The network layer provides capabilities required to control connections between end systems through the network, e.g. set-up and tear-down of connections.

A transport layer protocol (L4) in the OSI model above the network layer provides control of data transfer between end systems. Above the transport layer, a session layer (L5) is responsible for establishing and managing communication between presentation entities. For example, the session layer determines which entity communicates at a given time and establishes any necessary synchronization between the entities.

Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

A detailed explanation of the SS7 protocol may be found in Bell Communications Research, "Specification of Signaling System Number 7," Generic Requirements, GR-246-CORE, Issue 1, December 1994, the disclosure of which is incorporated herein in its entirety by reference. A summary description of the most relevant aspects of SS7 appears below.

For SS7, typical applications layer protocols include Transaction Capability Application Part (TCAP); Operations, Maintenance, Application Part (OMAP); and ISDN User Part (ISDN-UP). TCAP provides the signaling protocols for exchange of non-circuit related, transaction-based information, and has typically been used for accessing AIN databases such as Service Control Points (SCPs) in Advanced Intelligent Networks, described above. For example, TCAP specifies the format and content of an initial query message from an SSP to an SCP and various response messages from the SCP back to the SSP. ISDN-UP is the actual call control application protocol of SS7. ISDN-UP specifies the procedures for setting up and tearing down trunk connections utilizing CCIS signaling. ISDN-UP messages, for example, include an Initial Address Message (IAM) type query, and Address Complete Message (ACM) and Answer Message (ANM) type response messages.

SS7 specifies an Application Service Part (ASP) for performing the functions of the presentation, session and transport layers for the TCAP and OMAP protocols. The lower four layers of the SS7 protocol correspond to the lower three layers (network, link and physical) of the OSI model. The lower three layers of the SS7 protocol, the network layer, the signaling link layer and the data link layer, form the Message Transfer Part (MTP) of SS7. The MTP is common to messages for all applications and provides reliable transfer of signaling messages between network nodes. The MTP relays messages between applications running at different nodes of the network, effectively like a datagram type service.

The SS7 network layer (lower portion of L3) routes messages from source to destination. Routing tables for the signaling network layer facilitate routing based on logical addresses. The routing functionality at this layer is independent of the characteristics of particular links.

The signaling link layer (L2) performs flow control, error correction and packet sequence control. The signaling data link layer (L1) is the actual physical connection between nodes of the CCIS network. The signaling data link layer in CCIS provides full duplex packet switched data communications. The signaling data link layer element provides a bearer for the actual signaling message transmissions. In a digital environment, 56 or 64 Kbits/s digital paths carry the signaling messages between nodes, although higher speeds may be used.

At the equivalent of the OSI network layer (L3), the SS7 protocol stack includes a Signaling Connection Control Part (SCCP) as well as the network layer portion of the MTP. SCCP provides communication between signaling nodes by adding circuit and routing information to SS7 messages. The SCCP routing information serves to route messages to and from specific applications. Each node of the signaling network, including the various switching offices, transfer points, voice mail systems with SS7 capabilities, and databases in each network, is assigned a 9-digit point-code for purposes of addressing signaling messages through the CCIS network. Both the SCCP protocol and the MTP processing utilize these point codes. It will be helpful to consider the format of SS7 messages (FIG. 3) and particularly the routing information contained in each message.

Figures 3, 4:
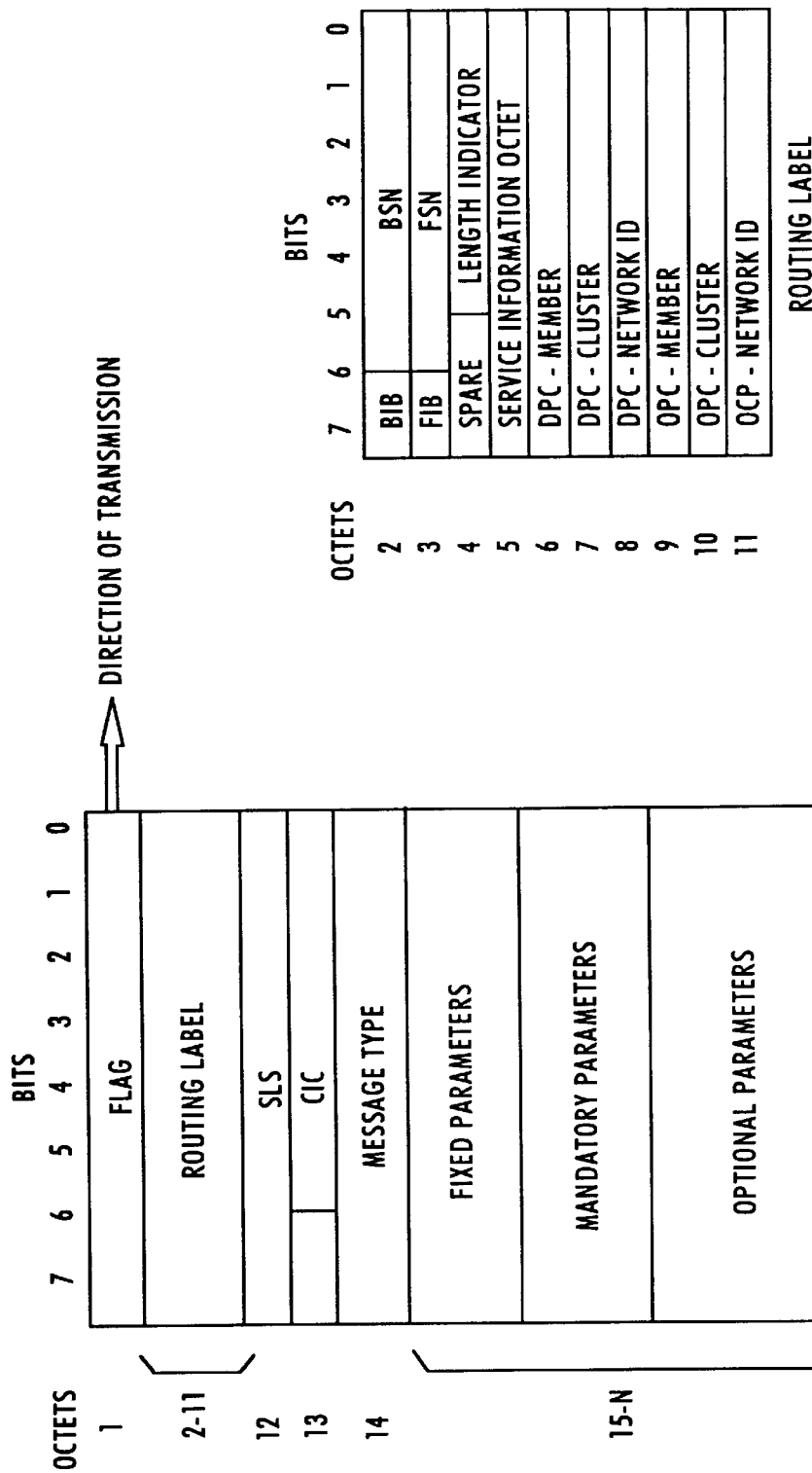
FIG. 3 is a diagram illustrating a layout of an SS7 protocol message packet.
FIG. 4 is a diagram illustrating the layout of the routing label portion of the SS7 protocol message packet shown in FIG. 3.

The SS7 messages traverse the network at all times. The messages themselves comprise digital serial messages that come into the various signaling points. FIG. 3 provides a graphic illustration of an SS7 message packet. The first byte or octet of the message is a flag, which is a zero followed by 6 ones and another 0. This constitutes a unique bit pattern in the SS7 protocol. The protocol ensures that this particular pattern is not repeated until the next message. This provides a flag at the beginning of a new message. A flag at the end of a message is also provided usually in the form of the flag at the beginning of the next message, i.e., a message usually contains only one flag. The message is arranged in 8 bit bytes or octets. These octets represent the information carried by the message. The message contains both fixed and variable parameters. The Message Transport Part (MTP) of the SS7 message is always in the same place. The values change but the MTP is always in the same place.

Octets 2–11 form a routing label as discussed later with regard to FIG. 4. Octet 12 contains a signaling link selection (SLS) byte used to select specific links and/or determine the extent to which the network can select specific links to achieve load sharing. Octet 13 contains a Customer Identification Code (CIC) which typically is used to select an interexchange carrier. Octet 14 contains a message type indicator, and octets 15-N contain the actual message, in the form of fixed parameters, mandatory parameters and optional parameters. The length of the mandatory parameters field and the optional parameters field are variable. There would be 16 other bits that have Cyclic Redundancy Codes (CRCs) in them and another flag which would constitute the end of the SS7 message (and typically the start of the next message). CRCs constitute a further error detection code which is a level 1 function in the protocol.

FIG. 4 is a graphic illustration of the routing label of the SS7 message packet. The first 7 bits of octet 2 constitute the Backward Sequence Number (BSN). The eighth bit is the Backward Indicator Bit (BIB) which is used to track whether messages have been received correctly.

For example, if EO2 in FIG. 1 sends a message to EO4, EO2 includes a Forward Sequence Number (FSN) in the 3rd octet of its message. Upon receiving this message, EO4 will include a Backward Sequence Number (BSN) equal to the FSN sent in the previous message in its next message to EO2. This indicates to EO2 that EO4 received the first message. This constitutes a positive acknowledgment of receipt of a message.

If the eighth bit of the second octet or Backward Indicator Bit (BIB) is inverted, it indicates a failure to receive the identified message. If the 8th bit in the 2nd octet, Backward Indicator Bit (BIB), is inverted, it tells the receiving node that the identified message was not received. The accompanying BSN represents the last message that was received. The receiving node will then invert its Forward Indicating Bit (FIB), 8th bit of the 3rd octet, acknowledging a retransmission remission request, and will begin to send the missing messages until the transmitting end successfully acknowledges all remaining messages, i.e.:

EO2 sends a message with a FSN of 5 to EO4;

EO4 transmits a message back to EO2 with an inverted BIB and a BSN of 2, indicating that was the last message it received;

EO2 then inverts its FIB and retransmits message 3;

If EO4 acknowledges this message correctly (BSN of 3) EO2 will retransmit message 4 and then 5.

Thus between the BIB and FIB and BSN and FSN, the STP keeps track of all of the messages sent between the two nodes at each end of a link. This provides predictability. If a node fails to receive an acknowledgment within a predetermined period of time it will take the link out of service because it is receiving no acknowledgments. This is usually a short period of time such as 1.6 seconds.

Every 8 bits represents another part of the message until the end of the message. At about the fourth octet there is a length indicator to indicate the length of the message. In this case the message is bad in that it indicates six which is not a complete message. Assuming a complete message where the length indicator indicates 23 octets, this provides another means for error detection. Thus if the recipient counts to 28 this indicates that something is wrong and the message is sent again.

Octet 5 is the Service Information Octet (SIO). This indicates whether it is a Fill In Signal Unit (FISU), Link Service Signaling Unit (LSSU) or Message Signaling Unit (MSU). MSUs are the only ones used for setting up calls, LSSUs are used for alignment, and FISUs are fill in signals. The MSU indicator type SIO octet is formatted and encoded to serve as an address indicator, as discussed below.

The routing label includes fields for both destination related addressing and point of origin addressing. Specifically, octets 6–11 contain the point codes, where the destination or 'called party' address includes octets 6, 7 and 8. Octets 9–11 carry origination point code (OPC) information, for example member, cluster and network ID information.

In the example shown in FIG. 4, the three octets of the called party address contain an actual destination point code (DPC) identified as DPC-member, DPC-cluster and DPC-network ID information. In operation, the translation tables stored in a transfer point such as the STP or in an ISTP (described below) cause the transfer point to actually route based on the DPC without translating any of the DPC octets into new values. In the case of an ISTP, the called party address octets (6–8) may carry other types of called party addressing information and receive different treatment by the ISTP. For example, these octets may carry a global title (GTT) and subsystem number (SSN) information. A transfer point utilizes a stored translation table to translate the GTT and SSN into an actual DPC, substitutes that DPC for the information in octets 6, 7 and 8, and then routes the message based on the DPC. As discussed more fully below, under certain circumstances, the ISTP will process application layer information from the SS7 message to determine whether to route or respond to the message. If the ISTP routes the message, the ISTP uses the actual DPC.

To distinguish the types of information carried in octets 6–8, the MSU type service information octet (5) contains an address indicator. For example, a '1' value in the first bit position in this octet signifies that the called party address octets contain a subsystem number, a '1' value in the second bit position in this octet signifies that the called party address octets contain a signaling point code. The third, fourth, fifth and sixth bits of the address indicator serve as the global title indicator and are encoded to identify the presence and type of global title value in octets 6–8.

Additional details regarding SS7 signaling are disclosed in the above-incorporated U.S. Pat. No. 5,631,948 to Bartholomew et al., and in U.S. Pat. No. 5,586,177 to Farris et al., the disclosures of which are incorporated in their entirety herein by reference.

Overview of Operation of Voice Mail Network

Figure 5:
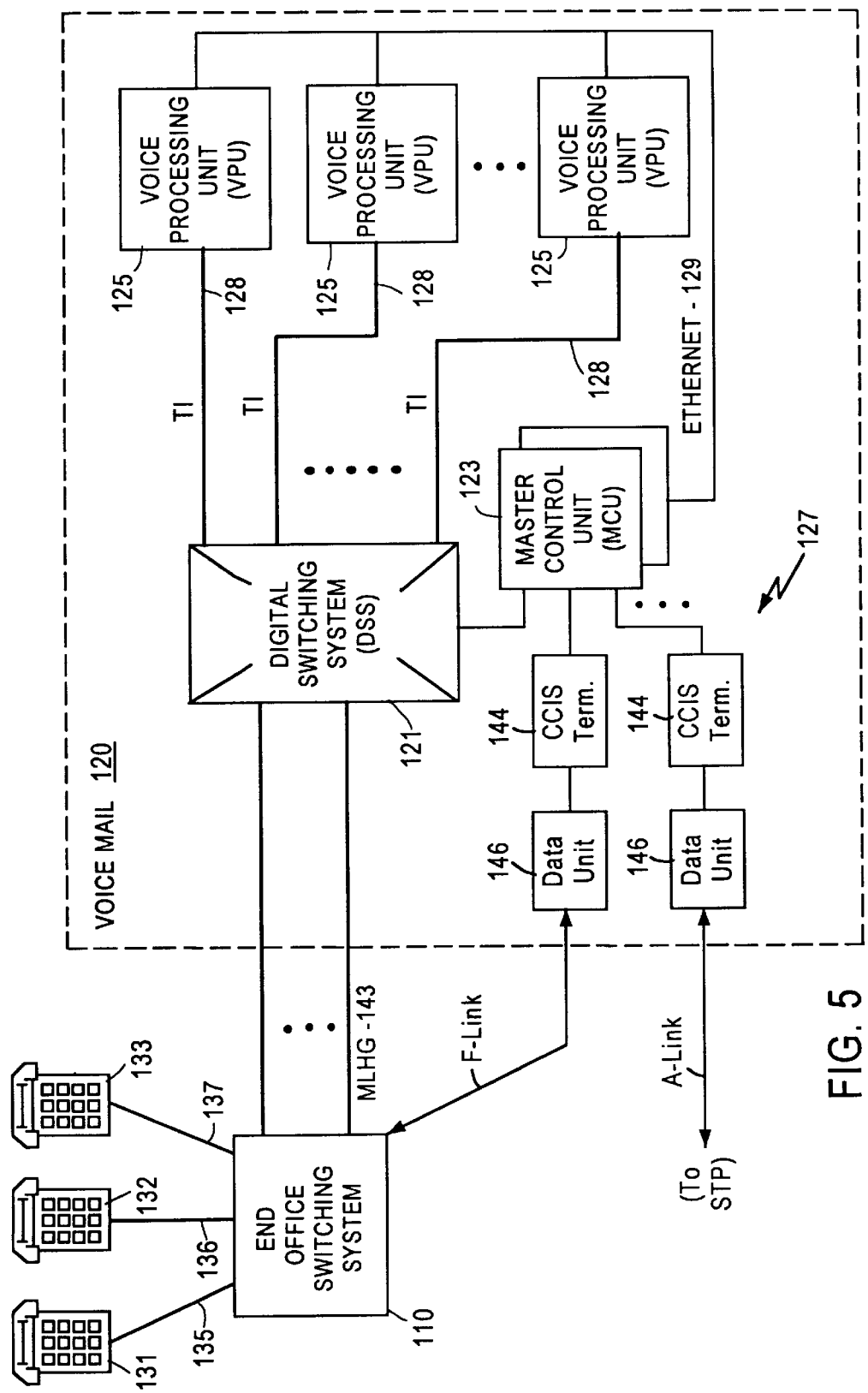
FIG. 5 is a block diagram illustrating in detail the SS7-capable voice mail system of FIG. 1.

FIG. 5 is a block diagram showing in detail the SS7-capable voice mail system (VMS) 22 of FIG. 1 according to an embodiment of the present invention. The VMS 22 comprises voice messaging equipment such as a voice mail system 120. Although referred to as "voice" messaging equipment, equipment 120 may have the capability of storing messages of a variety of different types as well as voice messages. For example, a single system 120 may receive incoming messages in the form of audible messages, such as voice messages, as well as text format data messages. The voice messaging equipment 120 may also store messages in an image data format, such as facsimile. Message service systems having the capability to store messages in a variety of audible, data and image formats are known, see e.g. U.S. Pat. No. 5,193,110 to Jones et al., U.S. Pat. No. 5,008,926 to Misholi and U.S. Pat. No. 4,652,700 to Matthews et al.

The illustrated voice mail system 120 includes a digital switching system (DSS) 121, a master control unit (MCU) 123, a number of voice processing units (VPU's) 125 and an SS7 signaling interface 127, described below. The master control unit (MCU) 123 of the voice mail system 120 is a personal computer type device programmed to control overall operations of the system 120.

Each of the voice processing units 125 also is a personal computer type device. The voice processing units 125 each include or connect to one or more digital mass storage type memory units (not shown) in which the actual messages are stored. The mass storage units, for example, may comprise magnetic disc type memory devices. Although not specifically illustrated in the drawing, the voice processing units 125 also include appropriate circuitry to transmit and receive audio signals via T1 type digital audio lines. To adapt the system 120 to receive information other than voice and/or offer services other than voice mail, one or more of VPU's 125 might be reprogrammed to run other types of applications and/or process other types of incoming information. For example, one such unit might process facsimile information, one might process E-mail, etc.

An ETHERNET type digital network 129 carries data signals between the MCU 123 and the voice processing units 125. The Ethernet network 129 also carries stored messages, in digital data form, between the various voice processing units 125. The system 120 further includes T1 type digitized audio links 128 between the DSS switch 121 and each of the voice processing units 125.

The voice mail system 120 also includes an SS7 signaling interface 127 enabling generation and transmission of TCAP query messages, as well as reception of SS7 signaling messages from the end office switching system 110 or any other SS7 signaling node. The voice mail system SS7 signaling interface 127 includes a CCIS terminal 144 and an associated data unit 146 that provides an SS7 signaling link between the master control unit 123 and a selected signaling node on the SS7 network, for example one of the STPs (see FIG. 1), an SP, or another SS7-capable VMS. Although two such links are shown, preferably there are a plurality of such links providing redundant connections to STPs of a mated pair and/or an end office switching system 110. These links provide sufficient capacity to carry all necessary signaling to and from the particular voice mail system 120.

The SS7 signaling through the CCIS terminal 146, the data unit 144 and the selected signaling node provides two-way signaling data transport for call set-up related messages to and from other offices for receiving a message (live or recorded) for storage in the voice mail system 120, or transmitting a recorded message to another voice mail system, described below. These call set-up related messages typically utilize the ISDN-UP (ISDN-users part) protocol portion of SS7. The SS7 signaling through the terminal 146, the data unit 144 and the STPs also provides two-way signaling data transport for communications between the VMS 120 and SPs storing subscriber profiles, such as End offices and ISTPs, described below. The communications between the VMS 120 and the database systems in the SPs utilize the TCAP (transactions capabilities applications part) protocol portion of SS7.

In various operations discussed in more detail below, calls can be forwarded to the voice mail system 120 in response to calls to subscriber's lines 135, 136, or 137 received by end office switching system EO3 110 and that subscribe to voice mail capabilities. The switching system 110 may also route some calls directly to the voice mail system 120 in response to callers 131, 132, or 133 dialing a telephone number assigned to the lines 143 going to the voice mail system 120. When the end office switching system 110 directs a call to the voice mail system 120, either as a forwarded call (busy or no answer) or as a direct call in response to dialing of a number for accessing the system 120, the switching system places the call on any available channel on the multi-line hunt group (MLHG) lines 143. Although FIG. 5 shows only a single end office connected to the VMS 120, the VMS 120 may be connected to a plurality of end offices 120 via respective MLHG lines.

According to the disclosed embodiment, when the end office switching system 110 forwards a call to the voice mail system 120, the switching system 110 will also provide various data relating to the call via an F link of the SS7 network. In particular, the switching system 110 transmits an SS7 data packet to the data unit 144 indicating which line of the multi-line hunt group 143, i.e. which T1 trunk and which DO channel on the trunk, that the new call will come in on. The SS7 data packet also identifies the called telephone number and the telephone number of the caller. For a call forwarded to a mailbox, the data from the exchange indicates the reason for the forwarding, and the caller telephone number (typically the directory number assigned to the called subscriber's normal telephone line) identifies which subscriber the forwarded call relates to. The data unit 146 forwards the SS7 data packet to the CCIS terminal 144, which extracts the message data from the SS7 packet and forwards the message data to the MCU 123. The master control unit 123 uses the multi-line hunt group line information and the subscriber's directory number to internally route the forwarded call though DSS switch 121 and one of the internal T1 links 128 to an available voice processing unit 125 and identifies the relevant subscriber to that voice processing unit via the Ethernet 125.

For each party who subscribes to a voice mail service provided by the centralized messaging system 120, the MCU 123 stores information designating one of the voice processing units 125 as the "home" unit for that subscriber. Each voice processing unit 125 stores generic elements of prompt messages in a common area of its memory. Personalized elements of prompt messages, for example recorded representations of each subscriber's name spoken in the subscriber's own voice, are stored in designated memory locations within the subscriber's "home" voice processing unit.

Each time a call comes in to the voice mail system 120, the master control unit 123 controls the digital switching system 121 to provide a multiplexed voice channel connection through to one of the voice processing units 125. Typically, the call connection goes to the "home" voice processing unit for the relevant subscriber. The voice mail subscriber is identified by data received by the SS7 signaling network, as described above. An SS7 packet received by one of the data units 146 is decoded, and the corresponding information is forwarded by the CCIS terminal 144 to the MCU 123. If all 24 DO channels within the T1 to the "home" voice processing unit 125 are engaged, the central processing unit 123 controls switch 121 to route the call to another voice processing unit 125 which is currently available.

The TCAP protocol provides standardized formats for various query and response messages. Each query and response includes data fields for a variety of different pieces of information relating to the current call. For example, an initial TCAP query from an SSP includes among other data a "Service Key," such as the calling party's address, and the digits dialed by the caller. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits. In accord with the invention, the MCU 123 is also capable of generating TCAP query messages, particularly to obtain routine information for transmitting a voice mail message to a remote VMS.

Accessing Routing Information

As described above, the VMS systems 22 of FIG. 1 and the VMS system 120 of FIG. 5 are configured to send and receive SS7 protocol messages. In particular, the SS7-capable VMS systems are configured for sending TCAP query messages and receiving TCAP response messages via the CCS network in order to obtain voice mail capabilities information and routing information accessed from a subscriber profile record corresponding to a called party. Hence, an originating voice mail system having SS7 capabilities can access routing information for a destination voice mail system from an alternate non-AIN node, for example a central office storing subscriber profile information, or an intelligent signal transfer point (ISTP) having a database storing call processing control information. Hence, an originating voice mail system can send a TCAP query message to obtain routing information without the necessity of AIN elements, such as a standalone service control point.

Figure 6:
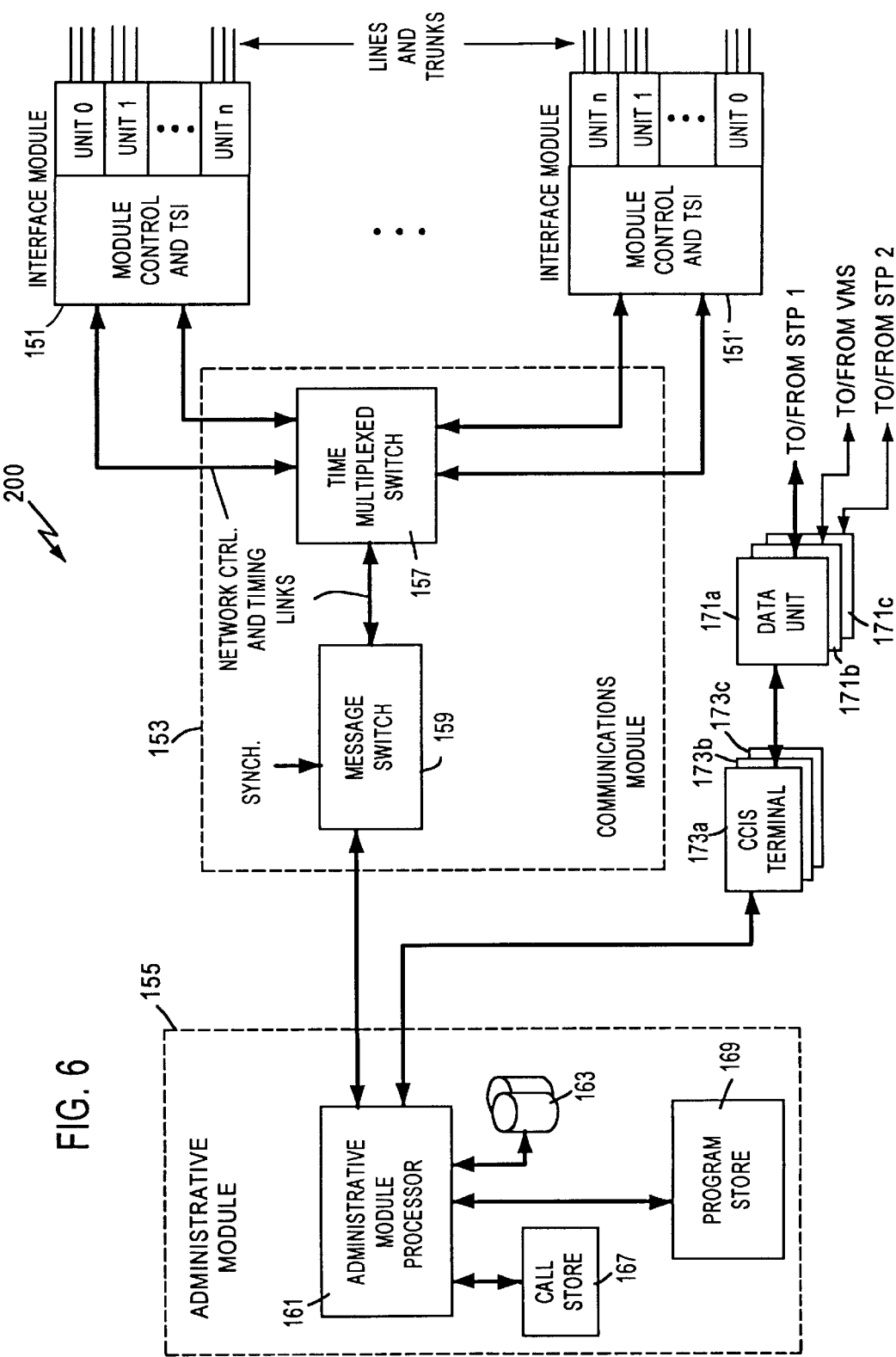
FIG. 6 is a block diagram illustrating in detail one of the central office switching systems of FIG. 1 storing subscriber profile information including associated voice mail system routing information according to an embodiment of the present invention.

FIG. 6 is a diagram illustrating one of the central office switching systems of FIG. 1A (e.g., EO3 or EO4) storing subscriber profile information including associated voice mail system routing information according to an embodiment of the present invention. The disclosed SSP-type central office switch 200 includes a number of different types of modules, including interface modules 151 (only two of which are shown), a communications module 153, and an administrative module 155.

The interface modules 151 each include a number of interface units 0 to n. The interface units terminate analog and digital lines from subscribers' stations, trunks, T1 carrier facilities, etc. Each such termination is identified by an OE number. Where the interfaced circuit is analog, for example a subscriber loop, the interface unit will provide analog to digital conversion and digital to analog conversion. Alternatively, the lines or trunks may use digital protocols such as T1 or ISDN. Each interface module 151 also includes a digital service unit (not shown), which is used to generate call progress tones and receive and detect dialed digits in pulse codes or dual-tone multifrequency form.

Each interface module 151 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 157 and thence to another interface module (intermodule call connection).

The communication module 153 includes the time multiplexed switch 157 and a message switch 159. The time multiplexed switch 157 provides time division transfer of digital voice data packets between voice channels of the interface modules 151 and transfers signaling data messages between the interface modules. The switch 157 together with the TSIs of the interface modules form the overall switch fabric for selectively connecting the interface units in call connections.

The message switch 159 interfaces the administrative module 155 to the time multiplexed switch 157, so as to provide a route through the time multiplexed switch permitting two-way transfer of control related messages between the interface modules 151 and the administrative module 155. In addition, the message switch 159 terminates special data links, for example a link for receiving a synchronization carrier used to maintain digital synchronism.

The administrative module 155 provides high level control of all call processing operations of the switch 200. The administrative module 155 includes an administrative module processor 161, which is a computer equipped with disc storage 163, for overall control of CO operations. The administrative module processor 161 communicates with the interface modules 151 through the communication module 153. The administrative module 155 may include one or more input/output processors (not shown) providing interfaces to terminal devices for technicians and data links to operations systems for traffic, billing, maintenance data, etc.

The CO also includes a plurality of CCIS terminals 173 and associated data units 171. For example, a CCIS terminal 173a and an associated data unit 171a provide an SS7 signaling link between the administrative module processor 161 and STP1; CCIS terminal 173b and data unit 171b provide a link with one of the SS7-capable VMSs 22; and CCIS terminal 173c and data unit 171c provide a link with STP2 (see FIG. 1). Preferably there are a plurality of such links providing redundant connections to both STPs of a mated pair and providing sufficient capacity to carry all necessary signaling to and from the particular office. The SS7 signaling through the terminal 173, the data unit 171 and the STPs provides two-way signaling data transport for call set-up related messages to and from other offices. These call set-up related messages typically utilize the ISDN-UP (ISDN-users part) protocol portion of SS7. The SS7 signaling through the terminal 173, the data unit 171 and the STPs also provides two-way signaling data transport for communications between the office and the SS7-capable VMS 22. The communications between the office and the VMS utilize the TCAP (transactions capabilities applications part) protocol portion of SS7.

As illustrated in FIG. 6, the administrative module 155 also includes a call store 167 and a program store 169. Although shown as separate elements for convenience, these are typically implemented as memory elements within the computer serving as the administrative module processor 161. The program store 169 stores program instructions which direct operations of the computer serving as the administrative module processor 161.

For each call in progress, the call store 167 stores translation and user profile information retrieved from disc storage 163 together with routing information and any temporary information needed for processing the call. For example, for a residential customer initiating a call, the call store 167 would receive and store line identification and outgoing call billing information corresponding to an off-hook line initiating a call from disc storage 163.

The user profile information stored in the disc storage 163 also includes information specifying voice mail capabilities (including called party capabilities and destination voice mail system capabilities), and an address (e.g., telephone number or network address) of the corresponding voice mail system. Specifically, if a subscriber subscribes to voice mail services, the corresponding user profile information stored in the disc storage 163 will include called party capabilities information, an address specifying a telephone number of the voice mail system, destination voice mail system capabilities information, and a signaling address (if applicable) for the destination voice mail system.

For example, the called party capabilities information may be a single bit set as a flag indicating that the called party subscribes to voice mail service. The telephone number of the voice mail system (i.e., the address) corresponds to the telephone number of the multi-line hunt group of the destination voice mail system. The destination voice mail system capabilities information may be a single bit that specifies whether the destination voice mail system has SS7 signaling capabilities, or whether the destination voice mail system lacks SS7 signaling capabilities. Assuming the destination voice mail system has SS7 capabilities, the profile information will also include the signaling address (e.g., the SS7 signaling point code) for the destination voice mail system on the SS7 signaling network.

The administrative module processor 161 is also configured to process TCAP query messages received by one of the data units 171 and the associated CCIS terminal 173. In particular, such queries relate to requests for user profile information stored in the disc storage database 163, including voice mail capabilities and an address of the corresponding voice mail system. The program store 169 also includes a routine for servicing a received TCAP query message. Specifically, the administrative module processor 161 executes a stored routine by accessing the call processing records based on the information in the TCAP query message, including, for example, data identifying the called station, plus the fact that the calling station is requesting mailbox-to-mailbox message transfer. The administrative module processor 161 consults the profile information in the database 163 to establish the existence and identity of a mailbox for the called number. If the identity of such a mailbox is found, the administrative module processor 161 originates a response to the originator of the TCAP query message that specifies the existence of a voice mail system for the called party (i.e., called party capabilities information), whether the voice mail system of the called party has SS7 capabilities (i.e., destination voice mail system capabilities), along with the appropriate routing label enabling the originating node to establish a line-sided connection with the destination voice mail system.

Hence an SS7-capable VMS system 22 may access routing information from a central office switch 200 by sending a TCAP query message to the central office. The SS7-capable VMS system is thus able to determine whether the called party subscribes to voice mail, as well as determining the Multi-Line Hunt Group number and SS7 signaling point code (if any) of the destination voice mail system.

Figure 7:
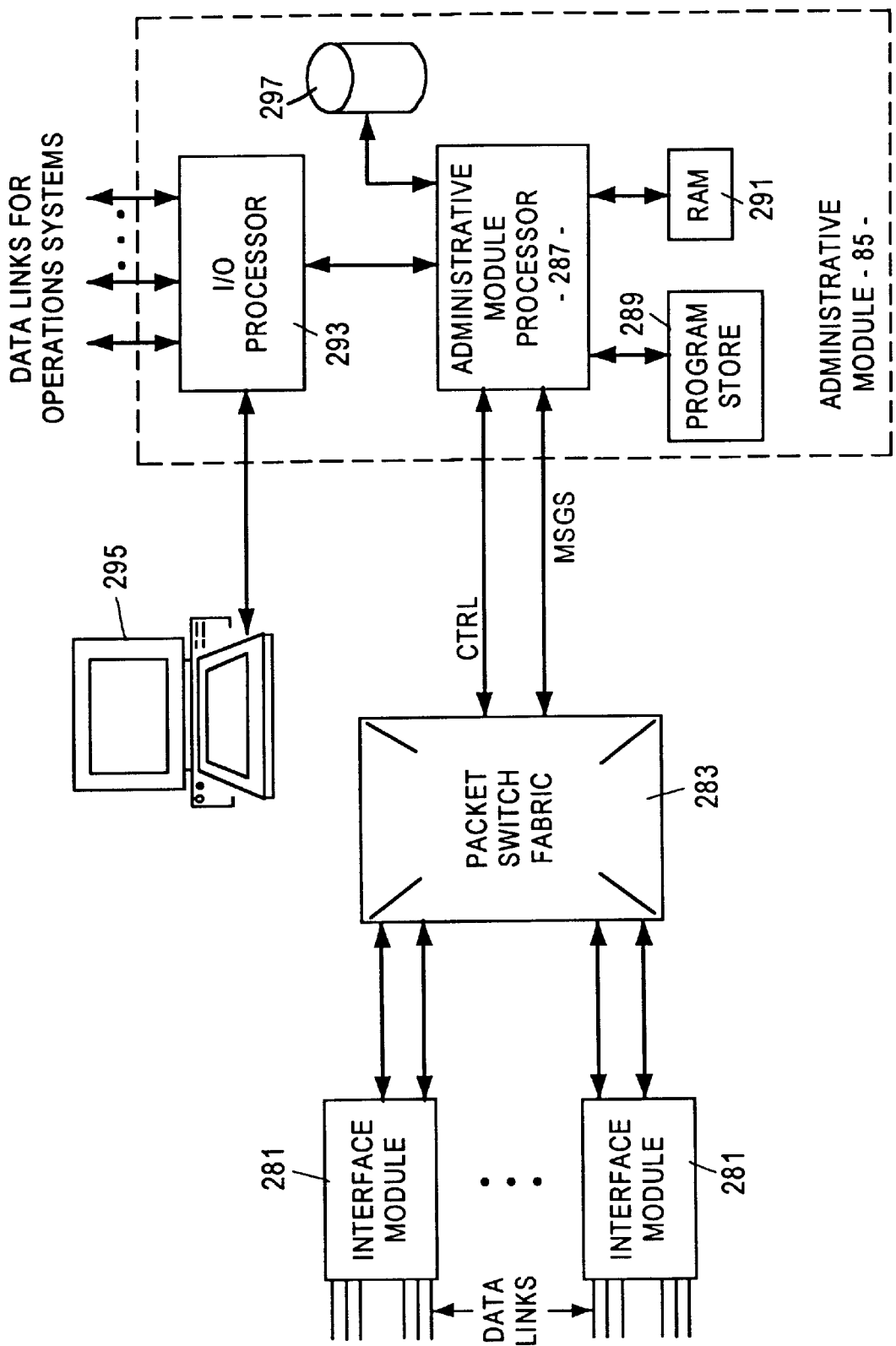
FIG. 7 is a diagram of an Intelligent Signal Transfer Point (ISTP) for storing voice mail system routing information according to another embodiment of the present invention.

An alternative source for routing information accessible by the SS7-capable VMS system is an ISTP, as shown in FIG. 1B and as described in the above-incorporated U.S. Pat. No. 5,586,177 to Farris et al. FIG. 7 is a block diagram illustrating the functional elements of one of the ISTPs of FIG. 1B according to an embodiment of the present invention.

The ISTP of FIG. 7 comprises interface modules 281, a packet switch fabric 283 and an administrative module 285. The interface modules 281 provide the physical connections to the two-way data links to the switching systems, VMSs, SCPs (not shown), STPs, other ISTPs, etc. Typically, these links provide two-way 56 kbits/s or 64 kbits/s virtual circuits between nodes of the CCIS signaling network. The modules 281 provide a two-way coupling of SS7 data packets, of the type shown in FIG. 3, between the actual data links and the packet switch fabric 283. The packet switch fabric 283 provides the actual routing of packets coming in from one link, through one of the interface modules 281 back out through one of the interface modules 281 to another data link. The packet switch fabric 283 also switches some incoming messages through to the administrative module 285 and switches some messages from the administrative module 285 out through one of the interface modules 281 to one of the data links, for example to trigger access to an internal database and formulate and send back an appropriate call control response message.

The administrative module 285 includes an administrative module processor 287, which is a computer equipped with RAM 291 and a program store 289, for overall control of operations of the switching office. Although shown as a logically separate element, the program store 289 typically is implemented as memory within the computer serving as the administrative module processor 287. The administrative module processor 289 provides control instructions to and receives status information from the operation control element (not shown) within the packet switch fabric 283. The administrative module processor 287 also transmits and receives some messages via the packet switch fabric 283 and the interface modules 281. The administrative module 285 also includes one or more input/output (I/O) processors 293 providing interfaces to terminal devices for technicians such as shown at 295 in the drawing and data links to operations systems for traffic recording, maintenance data, etc.

In accord with the present invention, the administrative module 285 also includes a database 297 storing call processing records (CPRs). The database 297 may be a Multi-Services Application Platform (MSAP) database similar to those used in existing ISCPs, although other types of databases can be used. The CPRs are customized to offer an array of intelligent services selected by individual customers.

The database 297 includes call processing records indicating whether a called party served by the ISTP subscribes to a voice mail system (i.e., the destination voice mail system), whether the destination voice mail system has SS7 capabilities, the telephone number of the multi-line hunt group (or network ID) of the destination voice mail system, and the SS7 point code (if applicable) of the destination voice mail system.

The administrative module processor 287 of the ISTP responds to a TCAP query message from an SS7-capable VMS system in a manner similar to that described above with reference to FIG. 6. Specifically, the administrative module processor 287, upon receiving a TCAP query message from the SS7-capable VMS system, accesses the database 297 based on the called number specified in the TCAP query message. Upon accessing the call processing record for the subscriber having the particular telephone number, the administrative module processor 287 formulates a response to the TCAP query message from the originating VMS. The ISTP retrieves the destination point code information and/or the telephone number (or network ID) of the multi-line hunt group of the destination voice mail system, from the subscriber's record. The ISTP reverses the destination and origination point codes from the query message (e.g., octets 6–8 with 9–11 in the routing label of FIG. 4), and uses the reverse point codes to control routing of the response message. The ISTP then routes the TCAP-formatted response-type signaling message back to the originating voice mail system that launched the query. Additional details regarding the ISTP are found in the above-incorporated U.S. Pat. No. 5,586,177 to Farris et al.

Hence, the TCAP response received by the originating voice mail system includes routing information that specifies (1) whether the called party has voice mail, (2) whether the destination voice mail system has SS7 capabilities, and (3) the routing information associated with the destination voice mail system (including the destination telephone number of the corresponding MLHG, and SS7 destination point code if the destination voice mail system has SS7 capabilities).

Voice Mail Messaging Operations

Figure 8:
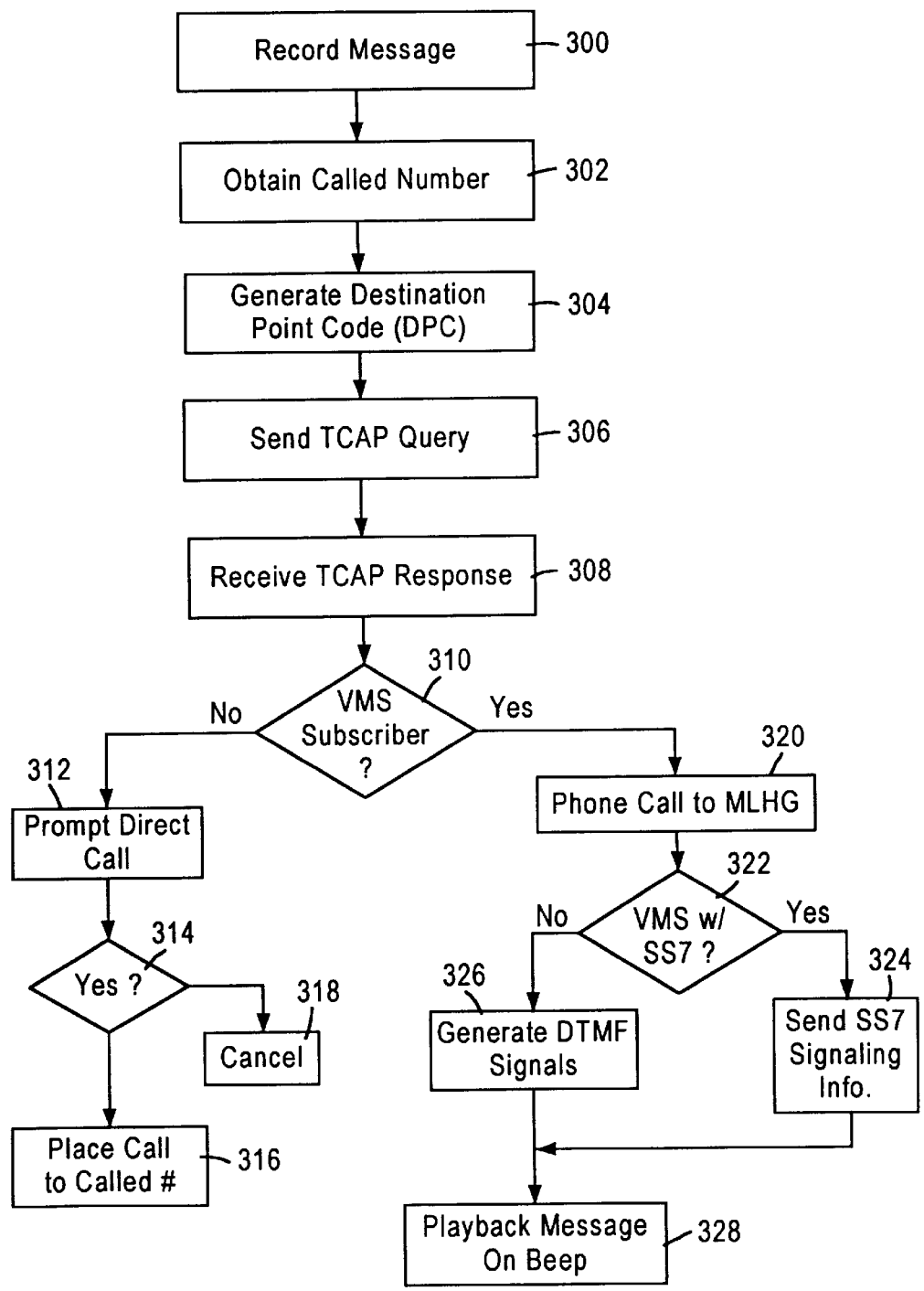
FIG. 8 is a flow diagram illustrating a method for identifying a destination voice mail system for transmitting a voice mail message according to an embodiment of the present invention.

FIG. 8 is a flow diagram illustrating a method for transmitting a voice mail message from an originating voice mail system to a destination voice mail system according to an embodiment of the present invention. The process usually begins by a subscriber of the originating voice mail system dialing the originating voice mail system in order to record a message to be transmitted to a destination voice mail system.

For example, a subscriber associated with VMS1 of FIG. 1 desiring to leave a voice message in the mailbox of a remote subscriber, such as the subscriber associated with VMS2 or VMS3, may use a telephone station to access his own voice mailbox in the voice mail system VMS1. This may be accomplished by dialing a number associated with the voice mail system VMS1 for this purpose. The voice processing unit 125 of the voice mail system may operate its voice menu to direct the caller to record a message and depress a specified key when satisfied with the message in a known fashion. The voice processing unit 125 of VMS1 thus records the message in step 300 in response to the caller inputs using the specified keys. It may then play a prompt to query the caller as to whether he or she desires to send the message and, if so, to depress another specified key. The voice processing unit 125 then will play a prompt instructing the caller as to the procedure for keying in the identity of the destination and to depress a further specified key to send the message. The voice processing unit 125 of VMS1 then will store the identity of the destination in step 302. The destination identity is typically entered as a called number for a specific party. The foregoing procedure is not intended to be exclusive and other procedures for leaving and commanding the dispatch of a message may be utilized. In all cases the message is digitized in conventional fashion and stored in the mailbox of the sender. The caller may then depress a designated send key. The depressing of the send key causes the originating voice mail system VMS1 to begin obtaining routing information for transmission of the recorded message.

Specifically, the MCU 123 of the originating voice mail system VMS1 generates a destination point code (DPC) in step 304 based on the called number received by the voice processing unit 125 of the originating voice mail system VMS1 in step 302. The master control unit 123 then formulates and outputs a TCAP query message in step 306 to the SS7 node specified by the destination point code. As described above, the destination point code may correspond to a central office serving the called party, or an ISTP storing call processing records for the called party. The VMS1 transmits the TCAP query through the SS7 network to the facility corresponding to the destination point code.

The TCAP message includes information identifying the calling station and mailbox, the called station and the fact that the caller is requesting mailbox-to-mailbox message transfer. As described above, the destination facility (i.e., the serving CO or the serving ISTP) accesses its stored subscriber records to establish the existence and identity of a mailbox for the called number. If the identity of such a mailbox is found, the destination facility formulates the appropriate response to the TCAP query message (e.g., by setting a flag bit in the response), as described above. If the called number does not have voice mail capabilities, the appropriate flag indicating voice mail capabilities is not set. The facility transmits the TCAP response back through the SS7 network to the VMS1.

The MCU 123 of the originating voice mail system VMS1 receives the TCAP response in step 308. The MCU 123 processes the TCAP response by first determining whether the called party is a voice mail subscriber in step 310.

If the called party does not subscribe to voice mail services, a prompt flag is set by the MCU 123 for the VPU 125 to prompt the subscriber in step 312 whether to initiate a direct call to the called party (step 312). The prompt may be generated by the voice processing unit 125 during the same session as the recording of the initial message, or may be recalled during a subsequent session with the subscriber.

If the subscriber responds to the prompt by depressing a key specifying the initiating of a direct call in step 314, the master control unit 123 initiates a line-sided connection in step 316 to the called party in order to play the recorded message upon detecting an off-hook condition at the called station. The originating VMS1 may also be configured to wait for one second of inactivity on the line following the off-hook condition in order to accommodate an answering machine at the called party premises. However, if in step 314 the subscriber selects not to initiate a direct call, the recorded message is canceled in step 318.

If in step 310 the master control unit 123 determines that the called party is a VMS subscriber, the MCU 123 obtains the telephone number of the corresponding MLHG from the TCAP response message, and places a line-sided call to the MLHG of the destination voice mail system in step 320. The MCU 123 also checks the TCAP response to determine whether the destination voice mail system has SS7 capabilities in step 322. Assuming the TCAP query message includes a flag indicating the destination voice mail system has SS7 signaling capabilities (e.g., VMS2 22 of FIG. 1), the MCU 123 sends SS7 signaling information including the called party number using the translated destination point code supplied in the TCAP response. The destination voice mail system having SS7 capabilities (e.g., VMS2 22) is able to identify the appropriate subscriber for the incoming call on the multi-line hunt group based on the received SS7 signaling information. The destination voice mail system can thus access any subscriber specific information, including a personalized greeting.

Assuming in step 322 that the TCAP response message indicates that the destination voice mail system does not have SS7 capabilities, the originating voice mail system in step 326 generates DTMF signals for the called party in step 326 in response to an off-hook condition on the multi-line hunt group of the destination voice mail system. Hence, the originating voice mail system is configured to enter the called party information in order to enable the destination voice mail system to identify the called party without use of the SMDI link 25b, shown in FIG. 1.

Once the destination voice mail system prompts for initiation of the message, usually by sounding a beep, the originating voice mail system begins playback of the message in step 328.

According to the disclosed embodiments, a voice mail system having SS7 capabilities is able to identify a destination voice mail system for a called party number without the necessity of accessing AIN databases. Rather, the SS7-capable voice mail system of the disclosed embodiment is able to access localized call processing records and subscriber information (e.g., from central office switches or ISTPs) in order to obtain the necessary call routing information. Moreover, the voice mail system having SS7 capabilities is able to perform a voice mail-to-voice mail transfer of a recorded message, regardless of whether the destination voice mail system has SS7 capabilities.

Although the disclosed embodiment describes an SS7-capable voice mail system initiating a line-sided connection with a destination voice mail system, the scope of the present invention encompasses various modifications, for example transferring the voice messages between voice mail systems via the SS7 network as described in the above-incorporated Bartholomew et al. patent.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. In a switched communications network comprising a first central office switching system providing a line-sided connection with a calling party, a second central office switching system serving a called party, and a common channel interoffice signaling network configured for exchanging signaling messages between the first and second central office switching systems, a method comprising:

connecting the calling party using the first central office switching system to an originating voice mail system serving the calling party;

recording a message by the calling party in the originating voice mail system;

receiving from the calling party and storing in the voice mail system a destination identity, the destination identity at least identifying a called party telephone number corresponding to the called party;

generating a query message in the voice mail system, based on the called party telephone number, requesting identification of a destination voice mail system serving the called party;

sending the query message from the originating voice mail system to the second central office switching system via the common channel interoffice signaling network;

accessing profile information for the called party from a database within the second central office switching system in response to reception of the query message;

generating a response message in the second central office switching system that includes the accessed profile information for the called party;

sending the response message from the second central office switching system to the originating voice mail system via the common channel interoffice signaling network; and initiating a connection by the originating voice mail system to the destination voice mail system based on the profile information in the response message received by the originating voice mail system; and transferring the recorded message by the origination voice mail system to a mailbox serving the called party in the destination voice mail system.

2. The method of claim 1, wherein the accessed profile information includes voice mail capabilities information associated with the called party and a location identifier for a destination voice mail system serving the called party, the initiating step comprising initiating the connection based on the location identifier.

3. The method of claim 2, wherein the voice mail capabilities information includes first subscriber voice mail capabilities data specifying that the called party telephone number is assigned said mailbox in the destination voice mail system, the initiating step comprising initiating said connection in response to detection of said first subscriber voice mail capabilities data in the TCAP response message.

4. The method of claim 3, wherein the voice mail capabilities information further includes destination voice mail system capabilities data specifying whether the destination voice mail system is configured for receiving messages via the common channel interoffice signaling network.

5. The method of claim 4, wherein the initiating step comprises:

initiating a line-sided connection to a Multi-Line Hunt Group serving the destination voice mail system based on a first portion of the location identifier; and sending a signaling message from the originating voice mail system to the destination voice mail system specifying the called party telephone number based on the destination voice mail system capabilities data and a second portion of the location identifier.

6. The method of claim 4, wherein the initiating step comprises:

initiating a line-sided connection to a Multi-Line Hunt Group serving the destination voice mail system based on a first portion of the location identifier; and sending DTMF signals specifying the called party telephone number to the destination voice mail system in response to a prompt on the line-sided connection from the destination voice mail system based on the destination voice mail system capabilities data.

7. The method of claim 6, wherein the transferring step comprises initiating playback of the recorded message on the line-sided connection a predetermined time after receiving a voicemail recording prompt.

8. In a switched communications network comprising a first central office switching system providing a line-sided connection with a calling party, a second central office switching system serving a called party, and a common channel interoffice signaling network configured for exchanging signaling messages between the first and second central office switching systems, a method comprising:

connecting the calling party using the first central office switching system to an originating voice mail system serving the calling party;

recording a message by the calling party in the originating voice mail system;

receiving from the calling party and storing in the voice mail system a destination identity, the destination identity at least identifying a called party telephone number corresponding to the called party;

generating a query message in the voice mail system, based on the called party telephone number, requesting identification of a destination voice mail system serving the called party;

sending the query message from the originating voice mail system to a signaling transfer point in the common channel interoffice signaling network, the signaling transfer point including a database storing profile information for the called party served by the second central office switching system;

accessing the database for the profile information by the signaling transfer point in response to reception of the TCAP query message;

generating a response message in the signaling transfer point that includes the accessed profile information for the called party;

sending the response message from the signaling transfer point to the originating voice mail system via the common channel interoffice signaling network; and initiating a connection by the originating voice mail system to the destination voice mail system based on the profile information in the response message received by the originating voice mail system; and transferring the recorded message by the origination voice mail system to a mailbox serving the called party in the destination voice mail system.

9. The method of claim 8, wherein the accessed profile information includes voice mail capabilities information associated with the called party and a location identifier for a destination voice mail system serving the called party, the initiating step comprising initiating the connection based on the location identifier.

10. The method of claim 8, wherein the voice mail capabilities information includes first subscriber voice mail capabilities data specifying that the called party telephone number is assigned said mailbox in the destination voice mail system, the initiating step comprising initiating said connection in response to detection of said first subscriber voice mail capabilities data in the response message.

11. The method of claim 10, wherein the voice mail capabilities information further includes destination voice mail system capabilities data specifying whether the destination voice mail system is configured for receiving messages via the common channel interoffice signaling network.

12. The method of claim 11, wherein the initiating step comprises:
    initiating a line-sided connection to a Multi-Line Hunt Group serving the destination voice mail system based on a first portion of the location identifier; and
    sending a signaling message from the originating voice mail system to the destination voice mail system specifying the called party telephone number based on the destination voice mail system capabilities data and a second portion of the location identifier.

13. The method of claim 11, wherein the initiating step comprises:
    initiating a line-sided connection to a Multi-Line Hunt Group serving the destination voice mail system based on a first portion of the location identifier; and
    sending DTMF signals specifying the called party telephone number to the destination voice mail system in response to a prompt on the line-sided connection from the destination voice mail system based on the destination voice mail system capabilities data.

14. The method of claim 13, wherein the transferring step comprises initiating playback of the recorded message on the line-sided connection a predetermined time after receiving a voicemail recording prompt.

15. A voice mail system for use in a switched communications network comprising a plurality of central office switching systems interconnected by trunks and an interoffice signaling network separate from the trunks configured for exchanging signaling messages between the central office switching systems, said voice mail system comprising:
    a voice processing unit configured for recording a message from a calling party and receiving a called number input by the calling party;
    a master control unit configured for generating a query message for requesting identification of a destination voice mail serving a called party associated with the called number, the master control unit configured for decoding a response message received from the interoffice signaling network and in response selectively initiating a connection with a destination voice mail system based on a corresponding destination telephone number and voice mail capabilities information associated with the called party in the response message, the master control unit generating the replay command in response to the connection with the destination voice mail system; and
    a signaling network interface configured for sending the query message and receiving the response message via the interoffice signaling network, respectively, to one of a central office switching system serving the called party and a signaling transfer point storing said destination telephone number and said voice mail capabilities information associated with the called party.

16. The voice mail system of claim 15, further comprising a digital switching system configured for switching calls between an assigned Multi-Line Hunt Group and a plurality of the voice processing units.

17. The voice mail system of claim 15, wherein the signaling network interface is an SS7-capable interface.

18. The voice mail system of claim 15, wherein the master control unit selectively outputs a signaling message including the called number to the destination voice mail system in response to detection in the response message of capabilities data indicating the destination voice mail system has signaling capabilities on the common channel interoffice signaling network.

19. The voice mail system of claim 18, wherein the master control unit outputs said signaling message using a signaling address detected in the response message.

20. A telecommunications network comprising:
    a first central office switching system configured for receiving a line-sided connection with a calling party;
    a common channel interoffice signaling network configured for transporting call set up signaling messages and query messages;
    a destination voice mail system having a mailbox serving a called party, the destination voice mail system having an assigned Multi-Line Hunt Group of telephone lines, the Multi-Line Hunt Group having a corresponding telephone number;
    a second central office switching system serving a called party and including a database storing profile information for the called party including the telephone number of the Multi-Line Hunt Group of the destination voice mail system, the second central office switching system configured for outputting via the common channel interoffice signaling network a TCAP format response message in response to a TCAP format query message requesting identification of the destination voice mail serving the called party; and
    an originating voice mail system configured for recording a message from the calling party and receiving a called number input by the calling party, the originating voice mail system outputting to the second central office switching system via the a common channel interoffice signaling network the TCAP format query message in response to a mailbox-to-mailbox transfer request from the calling party, the originating voice mail system decoding the TCAP response message and in response selectively initiating a connection with, and replaying the recorded message to, the destination voice mail system in response to the telephone number in the TCAP response message.

21. The network of claim 20, wherein the originating voice mail system comprises a first SS7 signaling network interface configured for sending the TCAP query message and receiving the TCAP response message via the common channel interoffice signaling network.

22. The network of claim 21, wherein the destination voice mail system includes a second SS7 signaling network interface, the first SS7 signaling network interface outputting to the second SS7 signaling network interface a signaling message carrying the called number in response to data in the TCAP format response data in the TCAP format response message indicating the destination voice mail system is configured for receiving said signaling message.

23. A telecommunications network comprising:
- a first central office switching system configured for receiving a line-sided connection with a calling party;
- a common channel interoffice signaling network configured for transporting call set up signaling messages and query messages;
- a destination voice mail system having a mailbox serving a called party, the destination voice mail system having an assigned Multi-Line Hunt Group of telephone lines, the Multi-Line Hunt Group having a corresponding telephone number;
- a signaling transfer point in the common channel interoffice signaling network including a database storing profile information for the called party including the telephone number of the Multi-Line Hunt Group of the destination voice mail system, the signaling transfer point configured for outputting via the common channel interoffice signaling network a TCAP format response message in response to a TCAP format query message requesting identification of the destination voice mail serving the called party; and
- an originating voice mail system configured for recording a message from the calling party and receiving a called number input by the calling party, the originating voice mail system outputting to the signaling transfer point via the a common channel interoffice signaling network the TCAP format query message in response to a mailbox-to-mailbox transfer request from the calling party, the originating voice mail system decoding the TCAP response message and in response selectively initiating a connection with, and replaying the recorded message to, the destination voice mail system in response to the telephone number in the TCAP response message.

24. The network of claim 23, wherein the originating voice mail system comprises a first SS7 signaling network interface configured for sending the TCAP query message and receiving the TCAP response message via the common channel interoffice signaling network.

25. The network of claim 24, wherein the destination voice mail system includes a second SS7 signaling network interface, the first SS7 signaling network interface outputting to the second SS7 signaling network interface a signaling message carrying the called number in response to data in the TCAP format response data in the TCAP format response message indicating the destination voice mail system is configured for receiving said signaling message.

26. A central office switching system for use in a public switched telephone network, the central office switching system comprising:
- one or more interface modules and a switch fabric coupled thereto configured for providing selective connections between lines of subscriber stations and between the lines and a trunk;
- an administrative module configured to control the switch fabric, the administrative module including a database storing subscriber profile information corresponding to the subscriber lines; and
- a signaling interface configured for receiving a query regarding one of the subscribers from a common channel interoffice signaling network and supplying the query to the administrative module, the administrative module formulating a response containing profile information regarding the one subscriber from the database, and the signaling interface outputting the response from the administrative module to the common channel interoffice signaling network.

27. The central office switching system of claim 26, wherein the profile information regarding the one subscriber from the database includes voice mail capabilities information associated with the subscriber and a location identifier for a destination voice mail system serving the subscriber station, the administrative module outputting the voice mail capabilities information and the location identifier in response to the query requesting information associated with a mailbox-to-mailbox message transfer.

* * * * *